United States Patent
Nishigaki et al.

(10) Patent No.: US 6,731,777 B1
(45) Date of Patent: May 4, 2004

(54) OBJECT RECOGNITION SYSTEM

(75) Inventors: Morimichi Nishigaki, Wako (JP); Masakazu Saka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,734

(22) Filed: May 10, 2000

(30) Foreign Application Priority Data

Jun. 16, 1999 (JP) ............................................. 11-169568

(51) Int. Cl.$^7$ ................................................. G06K 9/00
(52) U.S. Cl. ....................................... 382/106; 382/104
(58) Field of Search ................................ 382/106, 190, 382/209, 104; 340/937; 348/142

(56) References Cited

U.S. PATENT DOCUMENTS

| | | | | |
|---|---|---|---|---|
| 4,908,704 A | * | 3/1990 | Fujioka et al. | 348/155 |
| 5,410,346 A | * | 4/1995 | Saneyoshi et al. | 348/116 |
| 5,554,983 A | * | 9/1996 | Kitamura et al. | 340/937 |
| 5,806,019 A | * | 9/1998 | Ishiyama | 701/300 |
| 6,035,053 A | * | 3/2000 | Yoshioka et al. | 382/104 |

FOREIGN PATENT DOCUMENTS

| | | |
|---|---|---|
| JP | 06-150196 | 5/1994 |
| JP | 09-079821 | 3/1997 |

* cited by examiner

*Primary Examiner*—Leo Boudreau
*Assistant Examiner*—Tom Y. Lu
(74) *Attorney, Agent, or Firm*—Lahive & Cockfield, LLP

(57) ABSTRACT

An object recognition system includes one or more image sensors and a controller that is adapted for measuring the distance from the system to objects with respect to respective windows of an image captured by the sensors is provided. The controller forms clusters by uniting adjacent windows that have similar measured distances. The system includes a memory for storing data on a previously recognized physical object. The controller infers a physical object based on data on a previously recognized physical object and the speed of the vehicle relative to a previously recognized physical object and wherein said controller determines a combination of clusters that best matches the inferred physical object. The controller groups the clusters into one or more cluster groups according to the distance from the vehicle carrying the system and selects from one of the cluster groups those clusters that overlaps with a physical object inferred by the controller. The controller matches combinations of the selected clusters with the inferred physical object based on the attributes of the combined clusters and the attributes of the inferred physical object.

19 Claims, 9 Drawing Sheets

Fig. 3
(a)
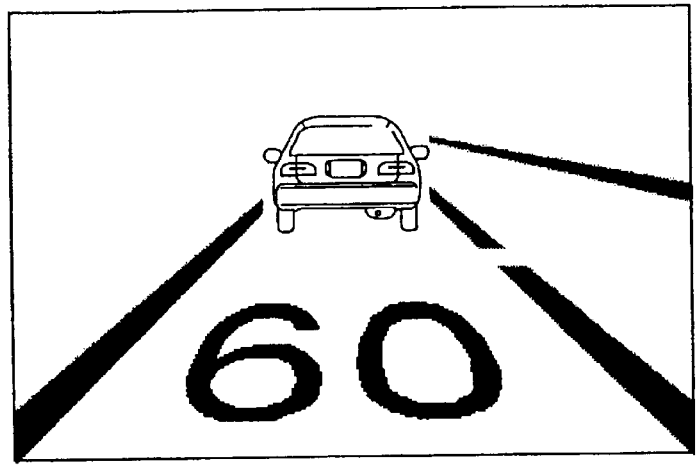
(b)
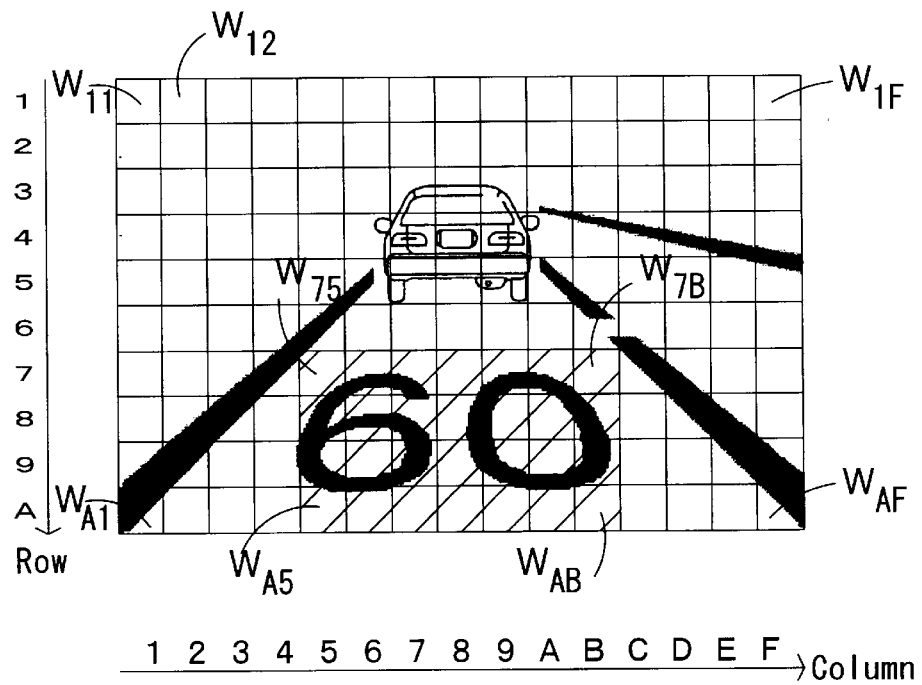

Fig.4

|   | $W_{75}$ |     |     |     | $W_{7B}$ |     |
|---|------|-----|-----|-----|------|-----|
|   | 5.8  | 6.0 |     | 5.7 | 5.5  |     |
|5.5| 5.7  | 5.5 |     | 5.5 | 5.6  | 5.4 |
|5.2| 5.1  | 5.2 |     | 5.2 | 5.2  | 5.5 |
|5.1| 5.2  |     |     |     |      |     |

$W_{A5}$ $\qquad\qquad W_{AB}$ (a)

|   | 1 | 1 |   | 2 | 2 |   |
|---|---|---|---|---|---|---|
| 1 | 1 | 1 |   | 2 | 2 | 2 |
| 1 | 1 | 1 |   | 2 | 2 | 2 |
| 1 | 1 |   |   |   |   |   |

Cluster 51 $\qquad$ Cluster 52

(b)

Fig.5
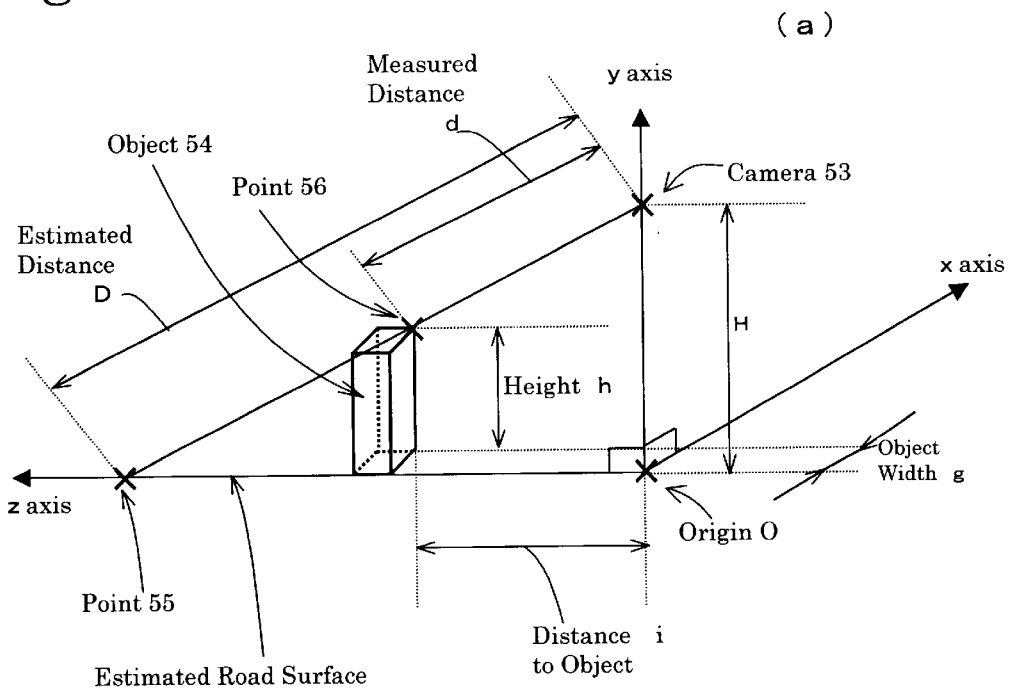
(a)
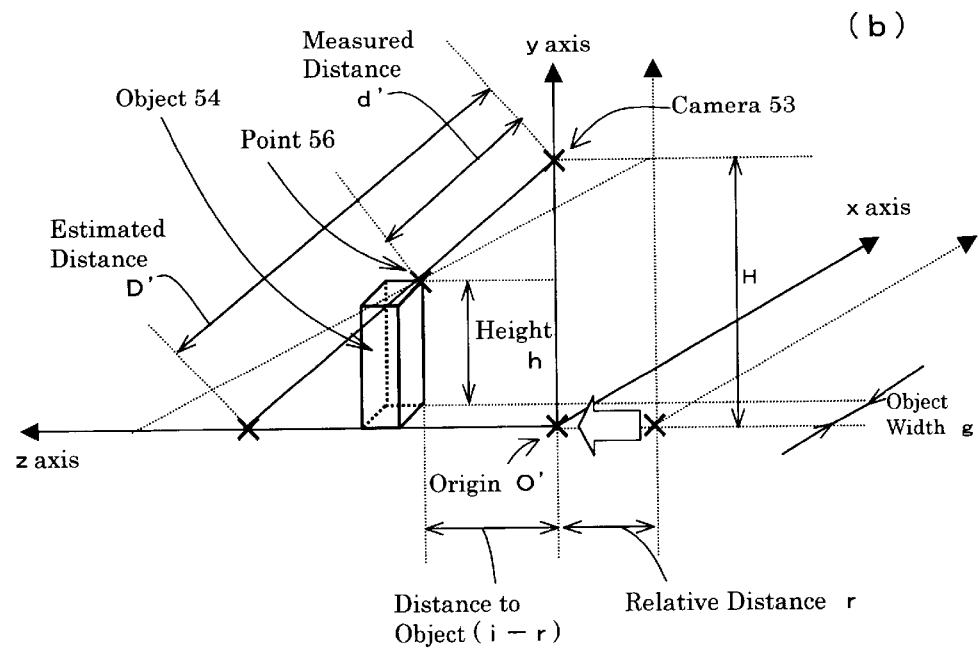
(b)

Fig.6
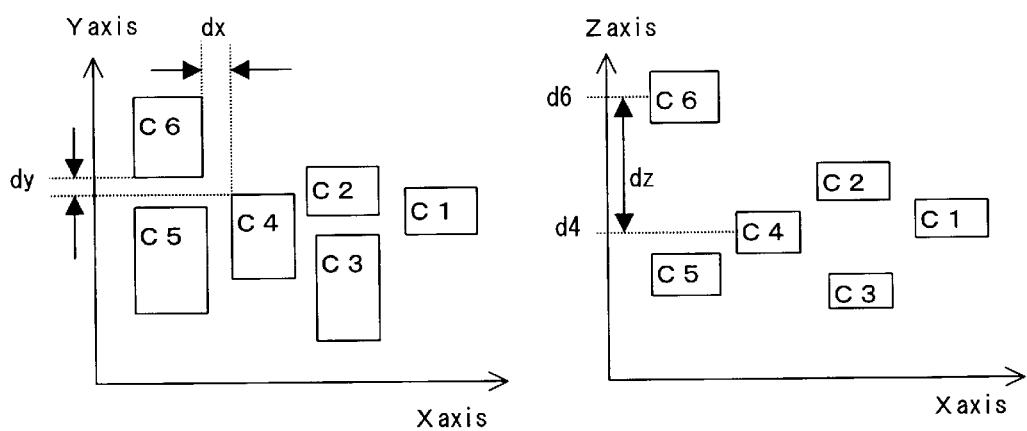
(a)  (b)
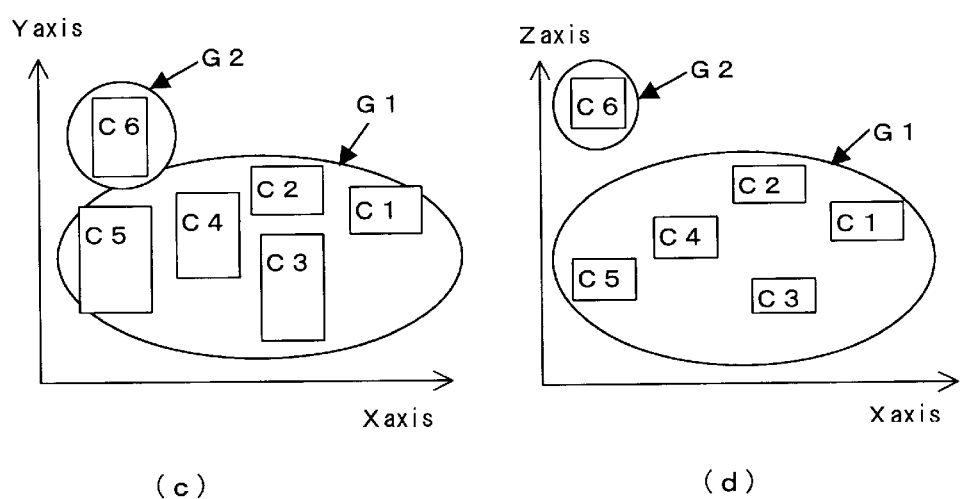
(c)  (d)

Fig. 8
(a)
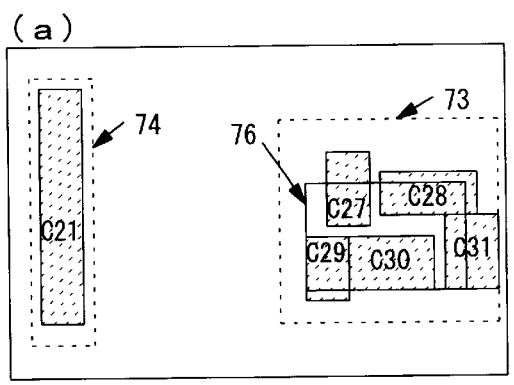
(b)
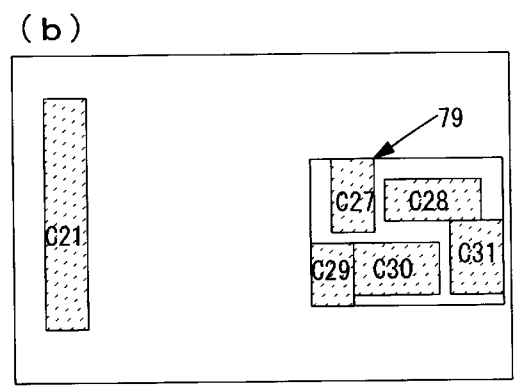
(c)
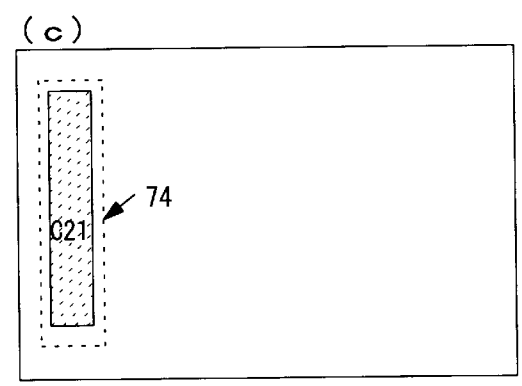
(d)
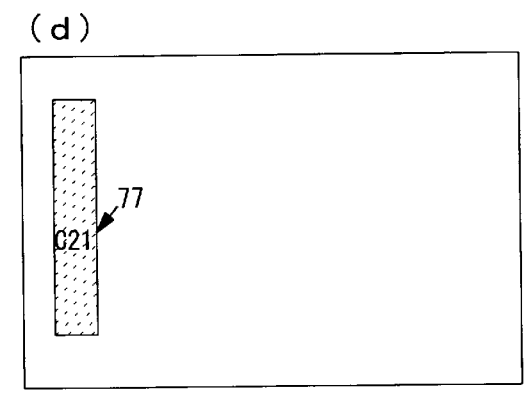

Fig.9

| # of Combined Clusters | Combined Clusters | Inferred Object | Functional Value E1 |
|---|---|---|---|
| 1 | C 2 2 | 7 5 | e 01 |
| 2 | C 2 3 | 7 5 | e 02 |
| 3 | C 2 4 | 7 5 | e 03 |
| 4 | C 2 5 | 7 5 | e 04 |
| 5 | C 2 6 | 7 5 | e 05 |
| 6 | C 2 2 + C 2 3 | 7 5 | e 06 |
| 7 | C 2 2 + C 2 4 | 7 5 | e 07 |
| 8 | C 2 2 + C 2 5 | 7 5 | e 08 |
| 9 | C 2 2 + C 2 6 | 7 5 | e 09 |
| 1 0 | C 2 3 + C 2 4 | 7 5 | e 10 |
| 1 1 | C 2 3 + C 2 5 | 7 5 | e 11 |
| 1 2 | C 2 3 + C 2 6 | 7 5 | e 12 |
| 1 3 | C 2 4 + C 2 5 | 7 5 | e 13 |
| 1 4 | C 2 4 + C 2 6 | 7 5 | e 14 |
| 1 5 | C 2 5 + C 2 6 | 7 5 | e 15 |
| 1 6 | C 2 2 + C 2 3 + C 2 4 | 7 5 | e 16 |
| 1 7 | C 2 2 + C 2 3 + C 2 5 | 7 5 | e 17 |
| 1 8 | C 2 2 + C 2 3 + C 2 6 | 7 5 | e 18 |
| 1 9 | C 2 2 + C 2 4 + C 2 5 | 7 5 | e 19 |
| 2 0 | C 2 2 + C 2 4 + C 2 6 | 7 5 | e 20 |
| 2 1 | C 2 2 + C 2 5 + C 2 6 | 7 5 | e 21 |
| 2 2 | C 2 3 + C 2 4 + C 2 5 | 7 5 | e 22 |
| 2 3 | C 2 3 + C 2 4 + C 2 6 | 7 5 | e 23 |
| 2 4 | C 2 3 + C 2 5 + C 2 6 | 7 5 | e 24 |
| 2 5 | C 2 4 + C 2 5 + C 2 6 | 7 5 | e 25 |
| 2 6 | C 2 2 + C 2 3 + C 2 4 + C 2 5 | 7 5 | e 26 |
| 2 7 | C 2 2 + C 2 3 + C 2 4 + C 2 6 | 7 5 | e 27 |
| 2 8 | C 2 2 + C 2 3 + C 2 5 + C 2 6 | 7 5 | e 28 |
| 2 9 | C 2 2 + C 2 4 + C 2 5 + C 2 6 | 7 5 | e 29 |
| 3 0 | C 2 3 + C 2 4 + C 2 5 + C 2 6 | 7 5 | e 30 |
| 3 1 | C 2 2 + C 2 3 + C 2 4 + C 2 5 + C 2 6 | 7 5 | e 31 |

OBJECT RECOGNITION SYSTEM

TECHNICAL FIELD OF THE INVENTION

The present invention relates to an optical object recognition system which detects objects in front of a vehicle such as an automobile, etc., using image capturing apparatus having cameras mounted on this vehicle. More specifically, the present invention concerns an object recognition system, which recognizes the characteristic features of objects using a plurality of windows in the captured images.

BACKGROUND OF THE INVENTION

In recent years, devices which determine the distance and size of objects in front of a vehicle, and which appropriately control the vehicle in accordance with this judgment, have been proposed for the purpose of improving the safety of vehicle operation.

Japanese Patent Application Kokai No. Hei 9-79821 describes one example of a device in which an optical distance measuring device consisting of two light-receiving elements is used to determine whether an object whose distance has been detected is a physical object or a road area (including characters or white lines on the road surface). The device calculates distance for respective calculation areas, and recognizes areas in which obstructions are present by clustering calculation areas whose mutual distances are within a fixed range and are proximate to each other in the horizontal direction. In forming the blocks, calculation areas whose distances have not been measured are also formed into blocks.

In the device disclosed in Japanese Patent Application Kokai No. Hei 9-79821, block formation is performed in cases where the distance values calculated from adjacent calculation areas are close to each other. Accordingly, in cases where a plurality of obstructions are located adjacent to each other in the image area, the obstructions may be formed into a single block and recognized as a single physical object. Because the ranges that are formed into blocks are fixed, a single obstruction may be erroneously recognized as a plurality of obstructions.

Accordingly, an object of the present invention is to provide a system which allows the accurate recognition of a plurality of physical objects present in the image area by utilizing information concerning past physical objects.

SUMMARY OF THE INVENTION

In accordance with one aspect of the invention, an object recognition system having one or more image sensors and a controller that is adapted for measuring the distance from the system to objects with respect to respective windows of an image captured by the sensors is provided. The controller forms clusters by uniting adjacent windows that have similar measured distances. The system includes a memory for storing data on a previously recognized physical object. The controller infers a physical object based on data on a previously recognized physical object and the speed of the vehicle relative to a previously recognized physical object and wherein said controller determines a combination of clusters that best matches the inferred physical object.

The controller groups the clusters into one or more cluster groups according to the distance from the vehicle carrying the system and selects from one of the cluster groups those clusters that overlaps with a physical object inferred by the controller. The controller matches combinations of the selected clusters with the inferred physical object based on the attributes of the combined clusters and the attributes of the inferred physical object.

According to another aspect of the invention, a method for recognizing a physical object is provided. The method comprises the steps of measuring distance from a vehicle to a physical object with respect to respective windows of an image captured by at least one image sensor, uniting adjacent windows that have similar measured distances to form clusters, inferring present position of a physical object based on data on a previously recognized physical object and the speed of the vehicle relative to the previously recognized physical, and determining a combination of clusters that best matches the inferred physical object.

The step of determining includes the step of selecting those clusters that overlaps with a physical object inferred by the controller and the step of matching combinations of the selected clusters with the inferred physical object based on the attributes of the combined clusters and the attributes of the inferred physical object.

According to another aspect of the invention, a method of recognizing a physical object is provided. The method comprises the steps of measuring distance from a vehicle to a physical object with respect to each window of an image captured one or more image sensors, clustering adjacent windows that are in a predetermined distance range, inferring present position of an physical object that was recognized in the previous recognition cycle, based on previous position of the physical object and the speed of the vehicle relative to the object, selecting clusters whose distance from the vehicle is within a predetermined tolerance relative to the distance of the inferred physical object and which overlaps with the inferred physical object, recognizing, as representing the physical object, the combined clusters that comprise one or more clusters selected by the selection step and that have closest attributes to the attributes of the inferred physical object.

The method may further comprise the steps of storing attributes of at least one sample physical object, and comparing attributes of combined clusters that were not selected in said step of selecting with attributes of said at least one sample physical object to recognize the sample physical object having closest attributes to be the physical object corresponding to the combined clusters.

The controller may comprise a micro-controller which typically includes a central processing unit (CPU) or a micro-processor, a read-only memory (ROM) containing control programs that when executed by the processor performs respective functions which are to be described hereafter. The controller also includes a random-access memory (RAM) that provides an working area for the CPU and temporary storage for various data and programs.

BRIEF DESCRIPTION OF THE DRAWINGS

FIG. 3(a) is a diagram showing the image that is picked up, and

FIG. 3(b) is a diagram showing the image divided into small areas (windows) for the purpose of judging distances and road areas, in the present invention.

FIG. 4 is a diagram illustrating the clustering of windows in the present invention.

FIG. 5(a) is a diagram illustrating the method used to express windows as three-dimensional information, and FIG. 5(b) is a diagram showing the changes in the three-dimensional information of windows that occur when the vehicle moves, in the present invention.

FIG. 6(a) is a diagram showing clusters as seen from the x-y plane,

FIG. 6(b) shows clusters as seen from the x-z plane, FIG. 6(c) shows cluster groups as seen from the x-y plane, and FIG. 6(d) cluster groups as seen from the x-z plane, in order to illustrate the determination of cluster groups in the present invention.

FIG. 8 is a diagram illustrating the recognition of physical objects for remaining clusters in the currently captured image shown in FIG. 7.

FIG. 9 is a table showing combinations of clusters in the present invention.

DETAILED DESCRIPTION OF THE INVENTION

Figure 1:
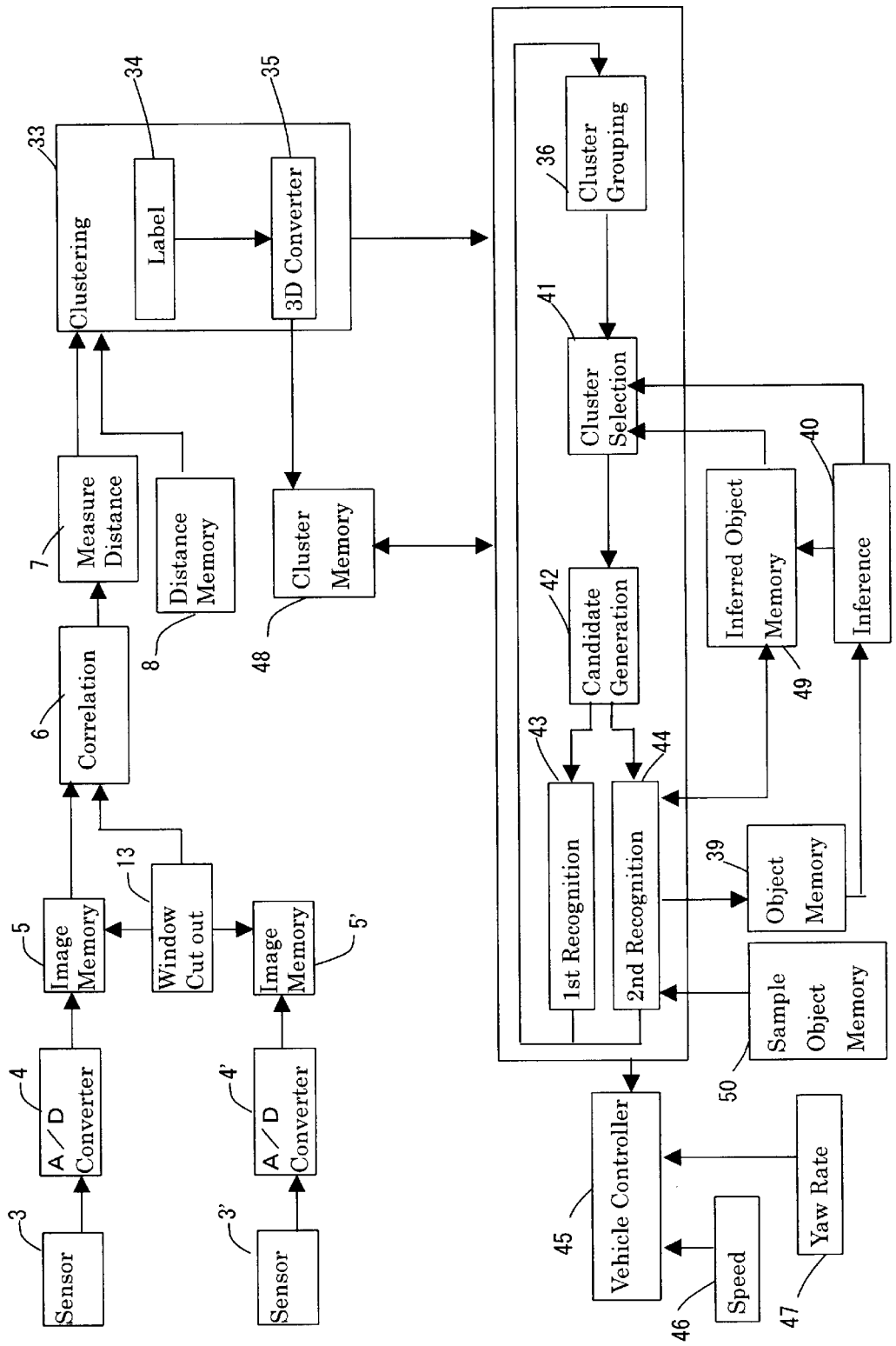
FIG. 1 is a block diagram illustrating the overall construction of one embodiment of the present invention.

The invention will now be described relative to preferred embodiments referring to attached figures. FIG. 1 is an overall block diagram of an object recognition system in accordance with one embodiment of the present invention. Other than the sensors 3 and 3', all the blocks in FIG. 1 may be incorporated in a controller which comprises a single chip or multiple chip semiconductor integrated circuit. Thus, FIG. 1 shows functional blocks of the controller. Respective functions of the blocks are performed by executing respective programs stored in the ROM of the controller.

Figure 2:
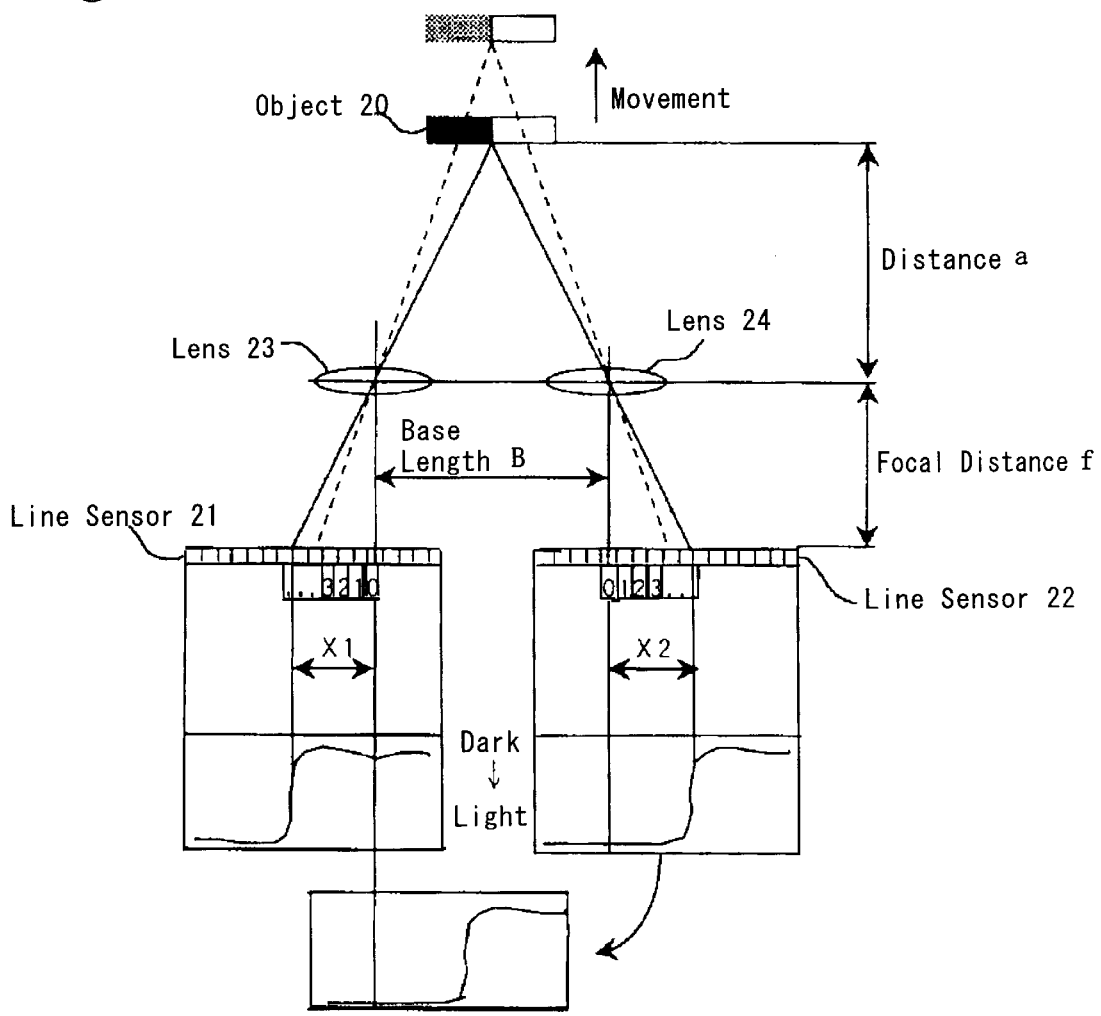
FIG. 2 is a diagram illustrating the principle of measurement by the triangulation method.

FIG. 2 is a diagram which indicates the distance measurement principle base on the triangulation method used in the present embodiment. First, a distance measurement method using a pair of image sensors will be described with reference to FIG. 2. A line sensor 21 and lens 23 constituting one of the abovementioned pair of image sensors are installed at a specified distance, i.e., at a distance equal to the base line length B in the horizontal or vertical direction from the line sensor 22 and lens 24 constituting the other image sensor of the other of the pair. The line sensors 21 and 22 are typically one-dimensional CCDs, but may also be linearly arranged photo-sensor arrays. Considering use at night, image sensors using infrared light are advisable. In this case, it is advisable to install infrared-transparent filters in front of the lenses 23 and 24, and to devise the system so that an object 20 is illuminated at predetermined time intervals using an infrared light source. Infrared light reflected from the object 20 is sensed by the line sensors 21 and 22.

The line sensors 21 and 22 are respectively positioned at the focal lengths "f" of the lenses 23 and 24. Assuming that an image of an object located at distance "a" from the plane of the lenses 23 and 24 is formed at a position shifted by a distance X1 from the optical axis of the lens 23 in the case of the line sensor 21, and is formed at a position shifted by a distance X2 from the optical axis of the lens 24 in the case of the line sensor 22, then, according to the principle of triangulation, the distance a to the object 20 from the plane of the lenses 23 and 24 is determined by the equation: $a = B \cdot f / (X1 + X2)$.

In the present embodiment, the images are digitized. And accordingly, the distance (X1+X2) is digitally calculated. The sum of the absolute values of the differences between the digital values indicating the brightness of the corresponding pixels of both images obtained from the line sensors 21 and 22 is determined while one or both of said images are shifted, and this sum is taken as a correlation value. The amount of shift of the images when this correlation value is at a minimum indicates the positional deviation between the two images, i.e., (X1+X2). In idealized terms, the distance by which the two images obtained from the line sensors 21 and 22 must be moved in order to cause said images to overlap as shown in FIG. 2 is (X1+X2).

Here, for the sake of simplicity, the image sensors were described as one-dimensional line sensors 21 and 22. However, in one embodiment of the present invention, as will be described below, two-dimensional CCDs or two-dimensional photo-sensor arrays are used as image sensors. In this case, the same correlation calculations as those described above are performed by relatively shifting the two-dimensional images obtained from the two image sensors. The amount of shift at the point where the correlation value reaches a minimum corresponds to (X1+X2).

The image sensor 3 shown in FIG. 1 corresponds to one of the image sensor in FIG. 2, consisting of the lens 23 and line sensor 21, and the image sensor 3' corresponds to the other image sensor in FIG. 2, consisting of the lens 24 and line sensor 22. In this embodiment, as is shown in FIG. 3(b), the imaged area is divided into a plurality of windows (small sections) $W_{11}$, $W_{12}$, ... and distance is measured for each window. Accordingly, a two-dimensional image of the overall object is required. Accordingly, each of the image sensor 3 and 3' is comprised of a two-dimensional CCD array or a two-dimensional photo-sensor array.

FIG. 3(a) shows an example of the image obtained when another vehicle running in front of the vehicle incorporating the system of the present invention is imaged by one of the image sensor 3 or 3'. FIG. 3(b) shows the image in FIG. 3(a) schematically split into a plurality of small sections called windows. FIG. 3(b) has rows in the vertical direction and columns in horizontal direction. For the sake of simplicity, the image is shown splitting into 10 rows×15 columns of windows. Reference numerals are assigned to the respective windows. For example $W_{12}$ indicates the window in row 1, column 2.

Referring to FIG. 1, the images of objects captured by the image sensor 3 and 3' are converted into digital data by analog-digital converters (A/D converters) 4 and 4' and stored in image memories 5 and 5'. The image portions corresponding to the window WI are respectively cut out from the image memories 5 and 5' by a window cutout part 13 and sent to a correlation calculating part 6. The correlation calculating part shifts the two cutout images by a specified unit at a time, and performs the aforementioned correlation calculations. The amount of shift at the point where the correlation value reaches a minimum corresponds to (X1+X2). The correlation calculating part 6 sends the value of (X1+X2) thus determined to a distance calculating part 7.

The distance calculating part 7 determines the distance a1, to the object in the window $W_{11}$ using the aforementioned formula: $a = B \cdot f / (X1 + X2)$. The distance $a_{11}$ thus determined is stored in a distance memory 8. A similar calculation process is successively performed for respective windows, and the resulting distances $a_{11}$, $a_{12}$, ... are stored in the distance memory 8. The distance to a captured object calculated for each window is referred to as the measured distance of the window.

In the image data used in the abovementioned correlation calculations, the pitch of the elements in the imaging element array determines the resolution. Accordingly, when a light-receiving element such as a photo-sensor array that has a relatively large pitch is used, it is preferred to enhance the density of the image data by performing calculations involving inter-pitch interpolation. Correlation calculations can be performed for image data whose density has thus been enhanced.

In order to correct for variations in the characteristics of the imaging element array according to temperature, a temperature sensor may be installed in the vicinity of the imaging element array, and the distance calculations are corrected based on temperature information obtained from the temperature sensor.

Next, the method used to cluster windows on the basis of the measured distances calculated as described above will be described. The clustering part 33 clusters windows on the basis of the measured distances of the respective windows. Initially, the label assigning part 34 in the clustering part 33 compares the measured distances of adjacent windows, and if these measured distances are substantially equal, the label assigning part 34 assigns the same label to these adjacent windows. The label assigning part 34 assigns labels to all windows that have measured distances, and windows that have the same labels jointly form a single cluster. The measured distances of adjacent windows are compared because the physical objects may be different objects even if the measured distances are the same in case the examined windows are discrete and remote to each other.

As an example, windows in which an image of the characters "60" on the road surface shown is captured as shown in FIG. 3(b) will be described. An image of the characters "60" is captured in an area (i.e., the shaded area in FIG. 3(b)) surrounded by the windows $W_{75}$, $W_{7B}$, $W_{A5}$ and $W_{AB}$. Examples of the distances measured for the respective windows included in this area are shown in FIG. 4(a). The units of the numerals are meters. Here, windows for which no measured distance is indicated are windows for which the distance could not be calculated because of lack of contrast. In FIG. 4(a), the measured distances of adjacent windows are compared, and if the difference in the measured distances is within a specified range (for example, a difference in measured distances of 0.5 meters or less may be designated as being within this specified range), then the same label is assigned to the two adjacent windows. This process is performed for all of the windows that have measured distances.

For example, the difference between the measured distance 5.8 m of the window $W_{76}$ and the measured distance 6.0 m of the window $W_{77}$ is 0.2 m. Accordingly, a label "1" is assigned to the respective windows. When similar process is performed for adjacent windows in the left-side portion of the image, a label "1" is assigned to each of the windows in the left-side portion of FIG. 4(b). In the right-side portion of the image shown in FIG. 4(a), the difference between the measured distance 5.5 m of the window $W_{89}$ and the measured distance 5.6 m of the window $W_{8A}$ (for example) is 0.1 m. Accordingly, a label "2" is assigned to the respective windows. Here, neither the window $W_{89}$ nor the window $W_{8A}$ is adjacent to a window to which the label "1" has been assigned. Consequently, different labels are assigned. The labels do not have to be numerals. Any symbols that can be distinguished, such as letters of the alphabet, etc., may be used.

When labels are thus assigned to the respective windows that have measured distance values, an area 51 which is united by the label "1" and an area 52 which is united by the label "2" are determined as shown in FIG. 4(b). These united areas are called "clusters".

Three-dimensional Data

Referring to FIG. 1, three-dimension converter 35 generates three-dimensional data of the clusters. As shown in FIG. 5, the three-dimensional information includes three coordinates in the present embodiment, i.e., horizontal position (x), vertical position (y) and road surface distance (z). The "x" coordinate expressing the horizontal position corresponds to the direction in which the columns of the windows are lined up (see FIG. 3(b)). The "y" coordinates that expresses the vertical position corresponds to the direction of height from the road surface. The z coordinate indicating the distance of the road surface corresponds to the direction in which the rows of the windows are lined up (see FIG. 3(b)). The "z" coordinate is proportional to the measured distance "d".

The origin O indicates that point of the road surface where the vehicle is located. The "x", "y" and "z" axes intersect at right angles at the origin O. The "x" axis extends to the left and right as seen from the vehicle. The "y" axis extends in the direction perpendicular to the road surface and the "z" axis in the direction of advance of the vehicle. The imaging camera 53 is located at a height "H" in the direction of the "y" axis from the origin O. The physical object 54 has a height "h" and a width of "g", and is located at a distance "i" in the direction of the "z" axis.

If the physical object 54 is not present, then the point 55 on the road surface is included in the image captured by the imaging camera 53. If the physical object 54 is present on the road, the window that would include the image of point 55 will include a point 56 of the physical object instead of the image of point 55 of the road surface. The estimated distance "D" is the distance between the imaging camera 53 and the point 55 on the road surface.

When no physical object 54 is present, this estimated distance "D" is equal to the measured distance to the captured point 55. In FIG. 5, the measured distance "d" is the distance from the imaging camera 53 to the point 56 of the physical object 54, which is calculated by the method described above with reference to FIG. 2. In the (x, y, z) coordinate system, the position of the imaging camera 53 is (0, H, 0) and the position of point 56 is (g, h, i).

Since the estimated distance "D" for each window and the height "H" of the imaging camera from the estimated road surface are fixed values, they can be calculated beforehand and stored. As is clear from FIG. 5, the height "h" of the object can be determined from the following equation (1), and distance "i" to the object 54 can be determined from the following equation (2).

$$h=(D-d)\times H/D \tag{1}$$

$$i=\sqrt{d^2-(H-h)^2} \tag{2}$$

The horizontal distance from the vehicle that is the distance in the "x" axis in FIG. 5 is determined beforehand for each column of windows based on the position of the imaging camera. For example, the third column of windows indicates positions 1 meter to the left from the center of the vehicle. Accordingly, the value of the "x" coordinate of point 56 (in the present example, this is g, and is equal to the value of the width of the object of imaging) can be determined based on the position of the window that includes point 56. Thus, the respective windows forming clusters can be expressed in terms of x, y and z coordinates. In another embodiment, it would also be possible to use (for example) the measured distance "d" instead of the "z" coordinate indicating the road surface distance, and windows could also be expressed using a different coordinate system from the coordinate system described above.

Thus, the three-dimension converter 35 represents the clusters in three-dimension and projects the image in three dimensions. Preferably a minimum rectangular parallelepiped that contains all of the points of a given cluster projected in three dimensions be determined, and the cluster be approximated by such a rectangular parallelepiped. In this way, the center position, width and height of the object can be determined and accurately recognized.

If the abovementioned x, y, z coordinate system is used, the width of each cluster approximated by a rectangular parallelepiped is the value obtained by subtracting the minimum "x" coordinate value from the maximum "x" coordinate value of the captured points, and the thickness of the cluster is the value obtained by subtracting the minimum "y" coordinate value from the maximum "y" coordinate value of the captured points. Furthermore, the center position of each cluster is expressed as a value obtained by subtracting the minimum value from the maximum value for each of the x, y and z coordinates and halving the result. The distance of the center position, the horizontal position and vertical position, and the cluster height and width (cluster attributes) of each cluster thus calculated are stored in the cluster memory 48.

FIG. 5(b) shows a case in which a vehicle positioned at the origin O in FIG. 5(a) moves toward the physical object 54 (the shifted origin is expressed as the origin O'), so that the relative distance of the vehicle to the physical object 54 is shortened by a distance of r. As in FIG. 5(a), the position of point 56, which is a part of the physical object 54, is specified using coordinates. Assuming that the horizontal position of the physical object does not change, then, since the vertical position of the physical object does not change (the heights of physical objects are invariable), only the z coordinate changes. Accordingly, the position of point 56 is expressed as (g, h, i−r).

Cluster Group

Returning now to FIG. 1, cluster grouping part 36 fetches clusters from the cluster memory 48 and determines cluster groups based on the cluster attributes. A "process completion" flag is set for the cluster that has thus been processed. At first, none of the clusters has a "process completion" flag set. Accordingly, all of the clusters are fetched and processed.

In the present embodiment, the cluster grouping part 36 compares the distances between a given cluster and other clusters as well as the differences in the horizontal positions and vertical positions of the clusters. If the differences are all equal to or less than certain threshold values, the luster grouping part 36 combines such clusters into a cluster group. This process is performed for all of the fetched clusters. When a plurality of lusters is positioned close to each other, there is a high probability that they belong to the same object.

It is preferred that different threshold values be used according to distance from the vehicle. In the present embodiment, the threshold values are set in accordance with the distance of the two clusters whose differences in position and distance are to be determined. The distance of the two clusters is calculated based on the number of windows included in respective clusters and the measured distances of such windows. For example, assume that the image includes two clusters C1 and C2, the respective distances of the clusters C1 and C2 from the vehicle are d1 and d2 and the numbers of windows included in the clusters C1 and C2 are w1 and w2 respectively. The distance of the two clusters from the vehicle can be calculated using the following equation (3). Here, values obtained by averaging the measured distances of the windows contained in the respective clusters are used as the distances d1 and d2 of the clusters.

$$\text{Distance of two clusters} = (d1 \; w1 + d2 \times w2)/(w1+w2) \tag{3}$$

In another embodiment, it would also be possible simply to take the value obtained by averaging the distances d1 and d2 of the respective clusters as the distance of the two clusters instead of calculating a weighted average on the basis of the numbers of windows in the clusters as in Equation (3). It would also be possible to take the value obtained by averaging the distances at the respective center positions of the clusters C1 and C2 as the distance of the two clusters. Since the measured distance and the road-surface distance of the imaged object in the window indicated by the z coordinate are proportional, it would also be possible to use road-surface surface distances.

The differences dx and dy in the horizontal positions and vertical positions of the two clusters are expressed as the spacing of the two clusters, and the difference in distance dz is expressed as the difference in the distances of the respective clusters (d1 and d2 in the above description). For example, FIG. 6(a) shows a plurality of clusters as seen from the x-y plane, and FIG. 6(b) shows the same clusters as those in FIG. 6(a), as seen from the x-z plane. The difference in the horizontal positions of the clusters C4 and C6 is expressed by dx in the direction of the "x" axis, and the difference in the vertical positions is expressed by dy in the direction of the "y" axis. If the distances of the clusters C4 and C6 from the vehicle are respectively d4 and d6, then the difference in distance is expressed by dz in the direction of the z axis.

Based on the distance of the two clusters from the vehicle calculated using the above equation (3), the threshold value can be set for example as shown in Table 1 below relative to the difference in distance between the clusters, and as shown in Table 2 below for the differences in horizontal positions and vertical positions of the two clusters.

TABLE 1

| Distance of two clusters (meters) | Threshold value of difference in distance dz (meters) |
| --- | --- |
| 0~14.9 | 3.0 |
| 15.0~29.9 | 5.0 |
| 30.0~ | 8.0 |

TABLE 2

| Distance of two clusters (meters) | Threshold value of differences in horizontal/vertical positions (dx and dy) (meters) |
| --- | --- |
| 0~5.9 | 1.0 |
| 6~ | 0.6 |

Larger threshold values are used as the distance from the vehicle is larger because the tolerance in the measured distance is larger as the object is positioned further from the vehicle. Larger threshold value is used for the differences in the horizontal and vertical positions as the distance between the two clusters becomes smaller as shown in Table 2. This is because when for example a physical object is at a short distance from the vehicle mounting the system, the contrast of the captured image may be too low to calculate the distance from the vehicle with respect to each window, which results in drop-out of a number of windows which in turn generates a larger spacing between the clusters.

Referring now to FIGS. 6(a) and 6(b), the cluster grouping part 36 selects two clusters from the clusters C1 through C6, calculates the differences in distances from the vehicle, horizontal positions and vertical positions, and judges whether or not the two clusters should be included in a same cluster group. For example, in the case of the clusters C1 and C2, the differences in distance from the vehicle and positions are equal to or less than the respective threshold values so that the clusters C1 and C2 are included in a same cluster group. Differences in distance from the vehicle and positions are also equal to or less than the respective threshold values in the case of the clusters C2 and C4. Thus, the clusters C2 and C4 are also included in the same cluster group. As a result, it is determined that the clusters C1, C2 and C4 can be included in the same cluster group G1.

On the other hand, in the case of the clusters C6 and C5, the differences in the horizontal and vertical positions are equal to or less than the threshold value, but the difference in distance from the vehicle exceeds the threshold value. Accordingly, it is determined that these clusters belong to different cluster groups. Thus, the cluster grouping part 36 determines two cluster groups G1 and G2 as shown in FIGS. 6(c) and 6(d). The cluster grouping part 36 assigns the same cluster labels to clusters that belong to the same cluster groups.

Inference of Physical Object

Figure 7:
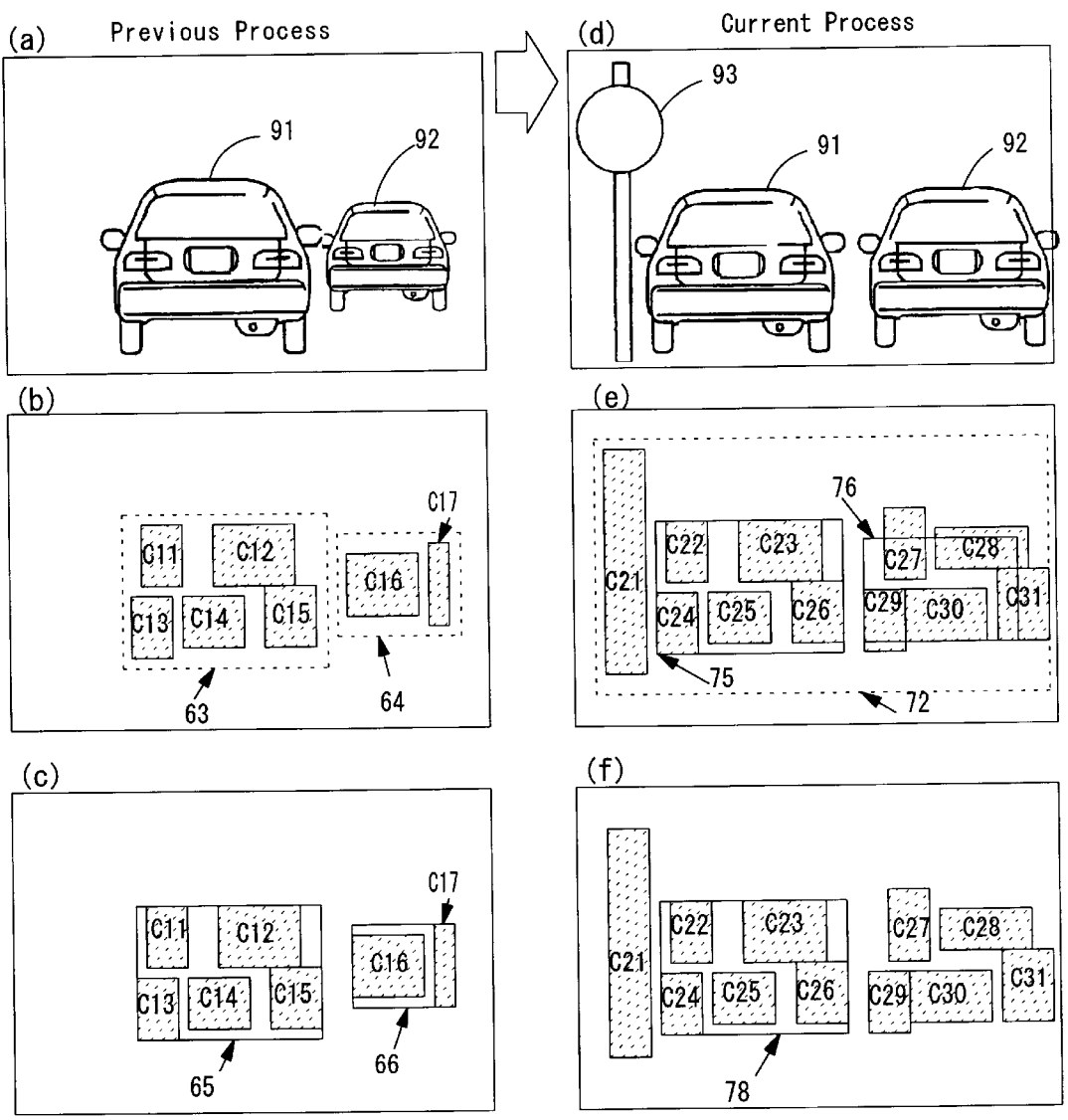
FIG. 7(a) is a diagram showing previous captured image.
FIG. 7(b) shows previous clusters and FIG. 7(c) shows previous recognized physical objects, Figure (d) shows current captured image.
FIG. 7(e) shows current clusters.
FIG. 7(f) shows current recognized physical objects.

Referring to FIG. 1, physical object inferring part 40 infers the positions of physical objects in the currently obtained image based on the positions of previously recognized physical objects and the relative speed with respect to the physical objects. The scheme used to infer physical objects in this embodiment will be described with reference to FIG. 7. FIGS. 7(a) through 7(c) show a previous processing, and FIGS. 7(d) through 7(f) show the current processing. In FIG. 7(a), two vehicles 91 and 92 are captured, while in FIG. 7(d), the same vehicles 91 and 92 as those in FIG. 7(a) as well as a sign 93 are captured.

FIG. 7(b) shows clusters C11 through C17 determined by the clustering part 33 which are grouped into cluster groups 63 and 64 by the cluster grouping part 36 based on the captured image shown in FIG. 7(a). FIG. 7(c) shows physical objects 65 and 66 recognized from the cluster groups 63 and 64, which correspond to the vehicle 91 and vehicle 92 respectively. The positions and sizes of the physical objects 65 and 66 are stored in a physical object memory 39 in the previous process.

The physical object inference part 40 reads out the positions and relative speeds of the previously recognized physical objects 65 and 66 from the physical object memory 39, and calculates the current positions of the physical objects 65 and 66. This calculation can be performed using the calculation formula: (position of previous physical object+relative speed×detection time interval)

In this example, the relative speed with respect to the physical object 65 is assumed to be zero, the relative speed with respect to the physical object 66 is assumed to be −10 kilometers per hour (in this example, when the speed of the vehicle mounting the system is greater than the speed of a physical object the relative speed is expressed as "minus"), and the detection time interval is assumed to be 100 milliseconds. The relative distance to the physical object 65 is unchanged between the previous detection and the current detection, and the relative distance to the physical object 66 is shortened by 0.3 meters.

Assuming the previous position of the physical object 65 expressed in terms of the center coordinates is (x1, y1, z1) and the position of the physical object 66 is (x2, y2, z2) with the position of the vehicle mounting the system being the origin and the respective coordinate values expressed in meters, the current position of the physical object 65 can be estimated as (x1, y1, z1), and the current position of the physical object 66 can be estimated as (x2, y2, z2−0.3). Here, it is considered that estimated physical objects are in the same horizontal positions as in the previous detection. In accordance with the coordinate system and origin used, the relative speed in case the speed of the vehicle mounting the system is larger or smaller relative to the physical object can be expressed in terms of "positive" or "negative". The positions of the physical objects may be calculated using a system other than that described above.

The physical object inferring part 40 can read out the width and height of the physical objects 65 and 66 from the physical object memory 39 and reconstruct the physical objects 65 and 66 in three dimensions in their respective current positions (x1, y1, z1) and (x2, y2, z2−0.3). The positions of the clusters in the images of the inferred physical objects can be determined. FIG. 7(e) shows physical objects 75 and 76, obtained by inferring the physical objects 65 and 66 as described above.

The physical object inferring part 40 stores the attributes (information concerning the physical objects such as distances, horizontal positions, vertical positions, widths and heights, etc.) of the inferred physical objects (hereafter referred to as "inferred physical objects") 75 and 76 in the inferred object memory 49. Furthermore, the process performed by the physical object inferring part 49 may be carried out in parallel with the process performed by the clustering part 33 and cluster grouping part 36.

Since the relative speed often varies according to the time, the positions of estimated physical objects can be specified as ranges. For example, instead of specifying the position of an estimated physical object calculated at a certain relative speed as a single point expressed as (x, y, z), it would also be possible to specify this position as a range such as (x−1, y−1, z−1) (x+1, y+1, z+1). Or, instead of specifying the position by means of a relative distance calculated at a certain relative speed of s kilometers/hour, it would also be possible to specify the position by means of a range of relative distances calculated at relative speeds of (s−5)~(s+5) kilometers per hour. By thus specifying the positions of physical objects as ranges, it is possible to estimate the positions of physical objects more accurately even in cases where the relative speed varies to a certain extent.

Cluster Selection

Returning now to FIG. 1, the cluster selection part 41 selects the cluster group that includes a cluster located at the shortest distance from the vehicle. An inferred physical object that has a distance from the vehicle whose difference from that of the cluster in the selected cluster group is within the threshold value and that has overlapping in the horizontal and vertical positions with the selected cluster group is selected from the inferred physical objects stored in memory 49. The cluster selection part 41 selects all of the clusters from the selected cluster group that overlaps with the selected inferred physical object.

Here, in case none of the clusters of the selected cluster group satisfy the distance difference conditions or in case no clusters have overlapping with the inferred objects stored in memory 49, all the clusters included in the selected cluster group are transferred to candidate generating part 42. Inferred physical objects that have no correspondence with the current clusters may be deleted from memory 49 because such physical objects no longer appear in the captured image. Preferably, process begins from the cluster groups and the inferred physical objects located at shortest distance from the vehicle because physical objects near the vehicle needs to be recognized at highest priority.

In regard to respective distances of the clusters and the inferred physical objects from the vehicle, the distances at respective center positions of such clusters and inferred physical objects may be used. Alternatively, values obtained by averaging the measured distances of windows forming clusters can be used as the respective distances of the respective clusters. The values shown in Table 1 above can be used as the threshold values for the differences in distance, or different threshold values may be used. The judgment of overlapping can readily be accomplished by projecting the clusters and inferred physical objects being compared onto the x-y plane, thus determining overlapping in the horizontal and vertical positions. An entire cluster may not be included in the inferred physical objects.

In the example shown in FIG. 7, it is assumed that the vehicles 91 and 92 and a traffic sign 93 shown in FIG. 7(d) are actually located at substantially the same distance from the vehicle. FIG. 7(e) shows the clusters C21 through C31 as determined by the clustering part 33 based on the captured image shown in FIG. 7(d). A single cluster group 72 comprising the clusters C21 through C31 is determined by the cluster grouping part 36.

The cluster selection part 41 selects cluster groups that include clusters located nearest to the vehicle. In this example, since there is only a single cluster group, the cluster group 72 is selected. Next, the distances and positions of the clusters forming the cluster group 72 are read from the cluster memory 48. The distances and positions of the of the inferred physical objects 75 and 76 are read from the inferred physical object memory 49. There are two inferred physical objects (i.e., the inferred physical objects 75 and 76), which show overlapping in the horizontal and vertical positions and have distance from the vehicle whose difference from the clusters of the cluster group 72 is smaller than the threshold value. Assuming that the inferred physical object 75 is located nearer to the vehicle than the inferred physical object 76, the inferred physical object 75 is selected. Next, the clusters C22 through C26 are selected which overlap with the inferred physical object 75 among the clusters of the cluster group 72. Thus, the clusters corresponding to inferred physical objects are selected as a group.

Combined Clusters

The candidate generating part 42 studies all possible combinations of the clusters selected by the cluster selection part 41, and determines a combination of clusters as candidates for a physical object. The combinations may include a combination comprising a single cluster. FIG. 9 is a table showing all possible combinations of the clusters C22 through C26 selected for the inferred physical object 75 in FIG. 7(e). For example, in combined cluster No. 10 in FIG. 9, combination of the clusters C23 and C24 is indicated. Here, it is preferred that the minimum rectangular parallelepiped including all the clusters forming combined clusters be determined, and that the combined cluster be approximated by this rectangular parallelepiped. In this way, the attributes of combined clusters (distance, position, size, etc.) can readily be determined.

After the combined clusters constituting candidates for a physical object have been generated by the candidate generating part 42, the process proceeds to a first recognition part 43 when combined clusters have an corresponding inferred physical object, and the process proceeds to a second recognition part 44 when combined clusters do not have a corresponding inferred physical object.

Object Recognition

The first recognition part 43 successively compares the attributes of combined clusters which have corresponding inferred physical objects with the attributes of the inferred physical objects. The recognition part 43 recognizes the combined clusters that have attributes closest to the attributes of the inferred physical objects as physical objects. Here, the attributes used are distance, horizontal position, vertical position, width and height, and the comparison of attributes is accomplished using the following Equation (4). The meanings of the variables in Equation (4) are shown in Table 3.

$$E1 = \sqrt{(Xc-Xt)^2 + (Yc-Yt)^2 + (Zc-Zt)^{2/C \cdot Zt}} + |Wc-Wt| + |Hc-Ht| \quad (4)$$

TABLE 3

| | |
|---|---|
| E1 | Functional value expressing difference in attributes between combined clusters and an inferred physical object |
| Xc | x coordinate of horizontal center position of combined clusters |
| Yc | y coordinate of vertical center position of combined clusters |
| Zc | z coordinate indicating distance of combined clusters |
| Wc | Width of combined clusters |
| Hc | Height of combined clusters |
| Xt | x coordinate of horizontal center position of an inferred physical object |
| Yt | y coordinate of vertical center position of an inferred physical object |
| Zt | z coordinate indicating distance of an inferred physical object |
| Wt | Width of an inferred physical object |
| Ht | Height of inferred physical object |
| C | Constant |

Equation (4) expresses the differences between combined clusters and an inferred physical object as a function of the difference in the center position of combined clusters and an inferred physical object and difference in width and height of combined clusters and an inferred physical object. The distance (Z value) has a tolerance according to the distance value, and is corrected by a value proportional to the distance Zt of the inferred physical object.

In the example shown in FIG. 9, functional values E1 (e01, e02, . . . e31) are calculated for all of the combined clusters 1 through 31 corresponding to the inferred physical object 75. Combined cluster 31 with the smallest functional value E1 is recognized as the physical object 78 (FIG. 6(f)). Combined cluster 31 having the smallest E1 best matches the position and size of the inferred physical object 75. For example, assuming that the functional values E1 of the combined clusters 1 through 31 shown in FIG. 9 have the relationship e01>e02 . . . >e07>e06 . . . >e17>e16 . . . >e26 . . . >e31 (eXX indicates the values calculated using Equation (4). Some of these values are omitted), then the combined cluster 31 consisting of clusters C22 through C26 corresponding to the functional value e31 is recognized as the physical object 78 (FIG. 7(f)).

As a result of such a comparison of attributes, in cases where (for example) a certain cluster overlaps with a plurality of estimated physical objects and represents small portions of the inferred physical objects, a combined cluster which does not include such a cluster is used for recognizing physical objects. Thus, physical objects can be recognized accurately.

The clusters C22 through C26 recognized as a physical object and the corresponding inferred physical object 75 are stored in the cluster memory part 48 and inferred physical object memory part 49 respectively with "processing completed" flags set in order to indicate that the physical object recognition process has been performed.

All the processes performed by the cluster group determining part 36, cluster selection part 41, physical object candidate extraction part 42 and first physical object recognition part 43 (or second physical object recognition part 44) is repeated until processing is completed for all of the clusters (in this example, until "processing completed" flags are set for all of the clusters). In other words, the cluster group determining part 36 checks the "processing completed" flags of the clusters stored in the cluster memory part 48, and when no clusters exist for which "processing completed" flags are yet to be set, the repetition ends.

Alternatively, it would also be possible to arrange the system so that an upper limit (e.g., 4) is set beforehand on the number of objects recognized as physical objects, and repetition of the processing is ended when the number of recognized physical object reaches this number.

FIG. 8 shows the process that follows the process of FIG. 7(f). In order to facilitate understanding, the clusters C22 through C26 recognized as a physical object and the corresponding inferred physical object are removed. The cluster group determining part 36 checks the "processing completed" flags of the clusters stored in the cluster memory part 48, and fetches the clusters C21 and C27 through C31 for which "processing completed" flags have not been set. The cluster group determining part 36 also checks the "processing completed" flags of the infrared physical objects stored in the inferred physical object memory part 49, and fetches the inferred physical object 76 for which a "processing completed" flag has not been set.

As is clear from FIG. 8(a), the differences in the horizontal positions of the cluster C21 and the clusters C27 through C31 exceed the threshold value. Accordingly, the cluster group determining part 36 newly determines respectively different cluster groups 73 and 74. As a result of this new determination of cluster groups, the clusters C21 and C27 through C31 will not be bound and erroneously recognized as a single object regardless of the position of the other inferred physical object.

Assuming that the distance of the cluster group 73 from the vehicle is shorter than the distance of the cluster group 74 from the vehicle, the cluster selection part 41 selects the cluster group 73. The inferred physical object 76 is selected, whose difference in distance from the clusters forming the cluster group 73 is equal to or less than the threshold value and that overlaps in the horizontal and vertical positions. Among the clusters forming the cluster group 73, the clusters C27 through C31 that overlaps with the inferred physical object 76, are selected.

The candidate generating part 42 determines combined clusters from combinations of the clusters C27 through C31. The first recognition part 43 compares the attributes of the respective combined clusters with the attributes of the inferred physical object 76. As a result, the combined cluster consisting of the clusters C27 through C31 is determined to have attributes that are the closest to those of the inferred physical object 76 so that the combined cluster consisting of the clusters C27 through C31 is recognized as a physical object 79 (FIG. 7(f)). The clusters C27 through C31 recognized as a physical object and the corresponding inferred physical object 76 are stored with "processing completed" flags in the cluster memory 48 and inferred physical object memory 49 respectively.

Next, the cluster grouping part 36 fetches from the cluster memory 48 the cluster C21 for which no "processing completed" flag has been set. Since this is a single cluster, the cluster C21 is treated as a cluster group. In this example, all the inferred physical objects have been processed so that there is no corresponding inferred physical object to be compared. Accordingly, the cluster selection part 41 selects the cluster C21 and transfers it to the candidate generating part 42. The candidate generating part 42 determines combined clusters from combinations of all of the clusters contained in a cluster group. Since the cluster C21 is a single cluster, C21 is treated as a combined cluster. The combined cluster consisting of cluster C21 is processed by the second recognition part 44.

Clusters representing physical objects are thus viewed in groups. Thus, repetition of the process starts with the determination of cluster groups. As described above, the distances and positions of inferred physical objects are determined based on the relative speed. Accordingly, the values used include a certain amount of tolerance. If clusters that overlaps with inferred physical objects are extracted without determining cluster groups, clusters whose horizontal positions are far from each other may be combined and may erroneously be recognized as a physical object.

The second recognition part 44 receives combined clusters from the candidate generating part 42 which comprise one or more clusters that do not have a corresponding inferred physical object, and compares their attributes with the attributes of predetermined physical objects that are to be detected. The recognition part 44 recognizes that one of the predetermined physical objects which has the smallest difference in the attributes as the physical object corresponding to the combined clusters. It is also possible to use threshold values for deciding that the predetermined physical object whose attributes differ to a small extent such that the difference is smaller than the threshold value represents the physical object. This comparison with predetermined physical objects is performed for all of the combined clusters.

The attributes of the predetermined physical objects are predetermined and are stored in a physical object memory 50. For example, if the objects to be detected include vehicles, the attributes of several types of vehicles are stored, and if the objects to be detected include traffic signs, the attributes of several types of traffic signs are stored. In this embodiment, width and height are used as the attributes that are compared. Distance, horizontal position and vertical position are not compared. Equation (5) shown below is used for the comparison of attributes. The meanings of the variables in Equation (5) are shown in Table 4. Equation (5) expresses the difference in attributes of combined clusters and a predetermined object as a function based on difference in width and height of combined clusters and a predetermined object.

$$E2 = |Wc - Wt| + |Hc - Ht| \quad (5)$$

TABLE 4

| | |
|---|---|
| E2 | Functional value expressing difference in the attributes of combined clusters and a predetermined physical |
| Wc | Width of combined clusters |

TABLE 4-continued

| | |
|---|---|
| Hc | Height of combined clusters |
| Wt | Width of a predetermined physical object |
| Ht | Height of a predetermined physical object |

In the example shown in FIG. 8(c), as described above the second recognition part 44 compares the attributes of the combined cluster consisting of the cluster C21 extracted by the candidate generating part 42 with the attributes of several predetermined physical objects to be detected, and determines the predetermined object to be detected that has the smallest functional value E2. Thus, the cluster C21 is recognized as a physical object 77 (FIG. 8(d)).

Since information concerning predetermined physical objects is used to recognize current physical objects, erroneous recognition of two physical objects as a single physical object can be avoided even when a vehicle ahead is close to a roadside object such a traffic sign or when a vehicle in an adjacent lane approaches a vehicle running ahead.

Preferably, a judgment as to whether or not the imaged object is a physical object is made on the basis of the positions and sizes of the clusters prior to the processes performed by the first and second physical object recognition parts 43 and 44. For example, if a cluster has a thickness in the height direction that exceeds a predetermined value, it may be judged to be a physical object. The clusters that are left without being recognized as physical objects by the first and second physical object recognition parts 43 and 44 may be judged not to be physical objects.

The first and second physical object recognition parts 43 and 44 store the attributes of currently recognized physical objects in the physical object memory 39. The attributes of previously recognized physical objects are also stored in the physical object memory 39. The first and second physical object recognition parts 43 and 44 calculate the relative speed of the vehicle with respect to physical objects based on a value determined from the calculation formula:

(current distance—previous distance)/detection time interval

The relative speed thus calculated is stored in the physical object memory 39. As was described above, the detection time interval is the time difference between the previous measurement and the current measurement, and can be set at, for example 100 milliseconds.

The vehicle controller 45 controls the vehicle mounting the system based on the information such as distance, position and relative speed of the physical objects stored in the physical object memory 39 and based on the information from devices such as an vehicle speed detection device 46 and yaw rate detection device 47 so that the distance to the physical objects is maintained at an appropriate value. For example, the vehicle controller 45 issues a warning to the driver by means of a voice message or sounding an alarm. The controller may also control the speed of the vehicle by forcible deceleration or acceleration.

To ensure recognition of physical objects, preferably judgment is made by the first and second physical object recognition parts 43 and 44 as to whether or not previously recognized objects and currently recognized objects are the same objects, and the vehicle controller 45 responds when the same object is continually recognized a certain predetermined number of times.

The correlation calculating part 6, distance measurement part 7, distance memory 8, window cut-out part 13, clustering part 33, cluster grouping part 36, cluster memory 48, physical object memory 39, physical object inferring part 40, cluster selection part 41, candidate generating part 42, first and second physical object recognition parts 43 and 44,
inferred physical object memory 49, object memory 50 and vehicle controller 45 can be implemented by a microcontroller which typically includes a central processing unit (CPU), a read-only memory (ROM) containing control programs and data and a random-access memory (RAM) providing an working area for the CPU and temporary storage for various data. In other words, computer programs stored in the ROM implements the above-described functions of the functional blocks shown in FIG. 1.

The distance memory 8, cluster memory 48, inferred physical object memory 49, physical object memory 39 and object memory 50 may be realized using different memory areas of a single RAM. Temporary storage areas for data required in various types of operations may also be provided by portions of the same RAM.

The object recognition device of the present invention may be LAN-connected with an engine electronic control unit (ECU), brake-control ECU and other ECU, and the output from this object recognition device can be used for overall control of the vehicle.

Thus, it has been shown that in the device of the invention physical objects are recognized using information concerning previously recognized physical objects. Accordingly, physical objects can be accurately recognized, without any erroneous recognition of a plurality of physical objects as a single physical object, or erroneous recognition of a single physical object as a plurality of physical objects. Physical object can be recognized by a comparison with attributes of predetermined physical objects to be recognized. Accordingly, even a plurality of physical object newly appearing in the image can be accurately recognized.

What is claimed is:

1. An object recognition system, comprising:
one or more image sensors;
a controller that is adapted for measuring the distance from the system to objects with respect to respective windows of an image captured by the sensors, wherein said controller forms clusters by uniting adjacent windows that have similar measured distances; and
a memory for storing data on a previous recognized physical object;
wherein said controller infers a physical object using the data on the previously recognized physical object and the speed of a vehicle relative to the previously recognized physical object and wherein said controller determines a combination of clusters that best matches the inferred physical object.

2. The system of claim 1, wherein said controller groups the clusters into one or more cluster groups according to the distance from the vehicle carrying the system.

3. The system of claim 2, wherein said controller selects from one of the cluster groups those clusters that overlaps with a physical object inferred by the controller.

4. The system of claim 3, wherein said controller matches combinations of the selected clusters with the inferred physical object based on the attributes of the combined clusters and the attributes of the inferred physical object.

5. The system of claim 4, wherein the controller calculates E1 according to the following equation and determines the combination of clusters that has the smallest E1 to be the clusters representing the physical object:

$$E1 = \sqrt{(Xc-Xt)^2 + (Yc-Yt)^2 + (Zc-Zt)^{2/Zt}}$$

where Xc is x coordinate of horizontal center of combined clusters, Yc is y coordinate of vertical center of combined clusters, Zc is z coordinate indicating distance of combined clusters from the vehicle, Xt is x coordinate of horizontal center of an inferred physical object, Yt is y coordinate of vertical center of the inferred physical object, Zt is z coordinate indicating distance of the inferred physical object from the vehicle, and C is a constant.

6. The system of claim 5, wherein Zt is determined by an equation:

previous Zt+relative speed×detection time interval.

7. The system of claim 5, wherein the following value is added to E1:

$$|Wc-Wt|+|Hc-Ht|$$

where Wc and Wt are width of combined clusters and the inferred physical object respectively, and Hc and Ht are height of combined clusters and the inferred physical object respectively.

8. The system of claim 6, wherein the relative speed is determined by dividing by the detection time interval the difference between a distance from the vehicle to the physical object that has been measured in the present process cycle and a distance from the vehicle to said physical object that was measured in the preceding process cycle.

9. An object recognition system, comprising:
one or more image sensors;
means for measuring distance from the system to a physical object with respect to each window of an image captured by the sensors;
means for clustering adjacent windows that are in a predetermined distance range;
means for inferring a present position of the physical object that was recognized in the previous recognition cycle, based on previous position of the physical object and the speed of a vehicle relative to the object;
selection means for selecting clusters whose distance from the vehicle is within a predetermined tolerance relative to the distance of the inferred physical object and which overlaps with the inferred physical object;
means for recognizing, as representing the physical object, the combined clusters that comprise one or more clusters selected by said selection and that have closest attributes to the attributes of the inferred physical object.

10. The system of claim 9, further comprising;
a memory for storing attributes of at least one sample physical object; and
means for comparing attributes of combined clusters that were not selected by said selection means with attributes of said at least one sample physical object to recognize the sample physical object having closest attributes to be the physical object corresponding to the combined clusters.

11. A method for recognizing a physical object, comprising the steps of:
measuring distance from a vehicle to the physical object with respect to respective windows of an image captured by at least one image sensor;
uniting adjacent windows that have similar measured distances to form clusters;
inferring a present position of the physical object using data on a previously recognized physical object and the speed of the vehicle relative to the previously recognized physical object; and
determining a combination of clusters that best matches the inferred physical object.

12. The method of claim 11, wherein said step of determining includes the step of selecting those clusters that overlaps with a physical object inferred by the controller.

13. The method of claim 12, wherein said step of determining includes the step of matching combinations of the selected clusters with the inferred physical object based on the attributes of the combined clusters and the attributes of the inferred physical object.

14. The method of claim 13, wherein said step of matching includes the step of calculating E1 according to the following equation to determine the combination of clusters that has the smallest E1:

$$E1=\sqrt{(Xc-Xt)^2+(Yc-Yt)^2+(Zc-Zt)^{2/C \cdot Zt}}$$

where Xc is x coordinate of horizontal center of combined clusters, Yc is y coordinate of vertical center of combined clusters, Zc is z coordinate indicating distance of combined clusters from the vehicle, Xt is x coordinate of horizontal center of an inferred physical object, Yt is y coordinate of vertical center of the inferred physical object, Zt is z coordinate indicating distance of the inferred physical object from the vehicle, and C is a constant.

15. The method of claim 14, wherein Zt is determined by an equation: previous Zt+relative speed×detection time interval.

16. The method of claim 14, wherein the following value is added to E1:

$$|Wc-Wt|+|Hc-Ht|$$

where Wc and Wt are width of combined clusters and the inferred physical object respectively, and Hc and Ht are height of combined clusters and the inferred physical object respectively.

17. The method of claim 15, wherein the relative speed is determined by dividing by the detection time interval the difference between a distance from the vehicle to the physical object that has been measured in the present process cycle and a distance from the vehicle to said physical object that was measured in the preceding process cycle.

18. A method of recognizing a physical object, comprising the steps of:
measuring distance from a vehicle to the physical object with respect to each window of an image captured one or more image sensors;
clustering adjacent windows that are in a predetermined distance range;
inferring a present position of the physical object that was recognized in the previous recognition cycle, based on previous position of the physical object and the speed of the vehicle relative to the object;
selecting clusters whose distance from the vehicle is within a predetermined tolerance relative to the distance of the inferred physical object and which overlaps with the inferred physical object;
recognizing, as representing the physical object, the combined clusters that comprise one or more clusters selected by the step of selecting and that have closest attributes to the attributes of the inferred physical object.

19. The method of claim 18, further comprising the steps of:
storing attributes of at least one sample physical object; and
comparing attributes of combined clusters that were not selected in said step of selecting with attributes of said at least one sample physical object to recognize the sample physical object having closest attributes to be the physical object corresponding to the combined clusters.

* * * * *